US010813500B2

(12) United States Patent
Abbiati

(10) Patent No.: US 10,813,500 B2
(45) Date of Patent: Oct. 27, 2020

(54) REFRIGERATED GRINDER

(71) Applicant: Gruppo Cimbali S.p.A., Binasco (IT)

(72) Inventor: Giacomo Abbiati, Binasco (IT)

(73) Assignee: Gruppo Cimbali S.p.A., Binasco (MI) (IT)

( * ) Notice: Subject to any disclaimer, the term of this patent is extended or adjusted under 35 U.S.C. 154(b) by 265 days.

(21) Appl. No.: 15/965,774

(22) Filed: Apr. 27, 2018

(65) Prior Publication Data

US 2018/0310767 A1    Nov. 1, 2018

(30) Foreign Application Priority Data

Apr. 28, 2017 (IT) .................. 102017000046730

(51) Int. Cl.
| A47J 42/54 | (2006.01) |
| F25B 21/02 | (2006.01) |
| A47J 42/36 | (2006.01) |
| A23F 5/08  | (2006.01) |
| A47J 31/42 | (2006.01) |
| A47J 42/50 | (2006.01) |

(52) U.S. Cl.
CPC .................. *A47J 42/54* (2013.01); *A23F 5/08* (2013.01); *A47J 31/42* (2013.01); *A47J 42/36* (2013.01); *A47J 42/50* (2013.01); *F25B 21/02* (2013.01); *F25B 2321/0251* (2013.01)

(58) Field of Classification Search
CPC .. A47J 31/42; A47J 42/54; A47J 42/50; A47J 42/36; A47J 27/026; A47J 27/17; A23F 5/08; F25B 21/02; F25B 21/04; F25B 2321/0251; F28F 3/12; H02K 5/20; B21C 11/08

USPC .......................................................... 241/65
See application file for complete search history.

(56) References Cited

U.S. PATENT DOCUMENTS

| 2,834,552 A   | 5/1958 | Gozzoli |
| 3,806,285 A * | 4/1974 | Sech ................... F04B 53/1002 |
|               |        | 417/568 |
| 5,865,383 A   | 2/1999 | Ford et al. |
| 8,702,021 B2* | 4/2014 | Bresciani ............... B02C 23/00 |
|               |        | 241/35 |
| 2010/0011975 A1 | 1/2010 | Mazzer |

(Continued)

FOREIGN PATENT DOCUMENTS

| GB | 844438 A | 8/1960 |
| WO | 2009/128110 A1 | 10/2009 |

(Continued)

*Primary Examiner* — Shelley M Self
*Assistant Examiner* — Teresa A Guthrie
(74) *Attorney, Agent, or Firm* — Seed IP Law Group LLP

(57) ABSTRACT

A grinder for beans of plant-based products, for example roasted coffee beans, includes a grinding chamber defined by a cylindrical wall and a pair of opposed grinding wheels located in the grinding chamber. At least one of the pair of opposed grinding wheels rotates. The grinder further includes an electric motor for driving the rotating grinding wheel and a first cooling duct extending in the cylindrical wall between a first inlet and a first outlet. A tubular circuit connected to the first cooling duct includes a pump for circulating fluid, a heat dissipater, at least one valve member, and an electronic control unit for actuating the pump and for turning on the heat dissipater according to a temperature sensed by a temperature sensor.

13 Claims, 15 Drawing Sheets

(56) References Cited

U.S. PATENT DOCUMENTS

| | | | |
|---|---|---|---|
| 2012/0286078 A1 | 11/2012 | Bresciani | |
| 2013/0209626 A1* | 8/2013 | Keller | A23F 5/08 |
| | | | 426/233 |
| 2013/0300229 A1* | 11/2013 | Muller | H02K 5/20 |
| | | | 310/54 |

FOREIGN PATENT DOCUMENTS

| | | | | |
|---|---|---|---|---|
| WO | WO-2009128110 A1 * | 10/2009 | | A47J 31/469 |
| WO | 2013/054238 A1 | 4/2013 | | |

* cited by examiner ent description, reference will in particular be made in the continuation of the present description to the grinding of roasted coffee beans.

REFRIGERATED GRINDER

BACKGROUND

Technical Field

The present disclosure relates to a refrigerated grinder for beans of plant-based products adapted for use in the preparation of beverages.

The grinder comprises a grinding chamber defined by a first cylindrical wall extending between a bottom and a top, a pair of opposed grinding wheels, at least one of which rotates, and which are located in said grinding chamber, an electric motor for driving the rotating grinding wheel, a hopper for loading the beans to be ground into the grinding chamber and an outlet channel for discharging the ground product out of said chamber.

Alternatively, the grinder also comprises a doser device of the ground product outlet from the grinding chamber.

Although the grinder forming the object of the present disclosure may be used to make the powder of the beans of any plant-based product susceptible, when ground, to be used for the preparation of a beverage, reference will in particular be made in the continuation of the present description to the grinding of roasted coffee beans.

Description of the Related Art

It is known that the crushing of beans by means of grinding wheels involves generating heat inside the grinding chamber, to which the heat generated by the friction between the moving parts is added and the one generated by the electric motor driving the rotating grinding wheel which is positioned in a conventional manner vertically aligned below the grinding chamber, in close contact with the bottom thereof, which is crossed by the rotation shaft to engage with the rotating grinding wheel.

In the case of grinding operations performed for short periods of time spaced by long periods of inactivity, the heat due to the grinding and the one transmitted by the electric motor do not cause very serious problems since the short operating periods are not sufficient to result in an accumulation of heat in the product to be ground or already ground.

The situation is quite different in the case of equipment installed in places with an increased production of beverages in which the grinding continues for lengthy periods spaced by brief pauses, and therefore the heat generated accumulates, becoming a problem.

Indeed, the flow of generated heat results in a heating both of the beans not yet ground and of the product already ground and remaining in the grinding chamber waiting to be dispensed in the form a predetermined dose for loading for example, a filter holder of an espresso coffee machine.

A thermal alteration of the ground coffee powder causes a variation of the organoleptic characteristics thereof, a modification of the extraction times of the aromas when the powder is used in the machine for making the beverage and accordingly, a different quality of the beverage produced.

Moreover, the generalised thermal alteration of the grinding chamber also results in the drawback that the thermal expansions undergone by the mechanical members intended to support the grinding wheels—expansions in the order of some tenths of a millimetre—significantly interfere with adjusting the distance between the grinding wheels which instead is in the order of a few hundredths, thus resulting in an error in the value of the particle size of the ground product.

According to the known technique, many attempts have been made to obviate the drawbacks caused by the heat that is produced within a grinder device.

One of the simplest—but rather ineffective—attempts is the one of providing a plurality of radial fins around the cylindrical wall of the grinding chamber, which fins protrude towards the outside environment with the intent to disperse the heat formed inside the grinding chamber in a passive manner. An example of such technology is described in EP 2 747 621 A1.

Another example of solution to avoid the accumulation of heat in grinding devices is the one illustrated in GB 844.438, which provides mounting a finned disc on the rotation shaft of the electric motor of the grinder, which disc is positioned between the stator of the electric motor and the bottom of the grinding chamber so that during the grinding, the same motor that moves the rotating grinding wheel also puts into rotation the aforesaid finned disc, which acts as a fan.

However, the solution indicated by the above-mentioned document has the drawback of performing any cooling action outside the grinding chamber only during the grinding itself because it is the motor itself that moves the rotatable grinding wheel to also drive the finned disc acting as a fan.

It is apparent that such a technical solution is completely ineffective at removing heat during periods of inactivity of the grinder and therefore of removing heat in the event of the quantity of the heat generated during the operation is greater than the one removed by the ventilation, as would occur in the event of prolonged grinding.

A further known cooling solution of the grinding chamber of a grinder device is the one described in U.S. Pat. No. 2,834,552 in which a sleeve is obtained around the grinding chamber, in which sleeve cooling water is pumped that is circulated by a pump. The latter is driven by the motor that actuates the rotatable grinding wheel with the consequence that the cooling occurs at the same time as the generation of the heat, without any possibility of removing the quantity of heat accumulated when the one generated is greater than the one that may be removed during the cooling.

However, according to a different technical solution illustrated in WO 2009/128110 A1, within a machine for dispensing a dose of beverage of coffee ground at the same time as the request for dispensing such dose, the grinding chamber is provided with a duct that surrounds the wall of the grinding chamber. Such duct is inserted in the cold water supply circuit to the heater from which the dose of hot water to the beverage dispensing machine originates.

According to the aforesaid technical solution, before reaching the heater and from it, the beverage dispensing machine, the dose of cold water is caused to pass in the duct that surrounds the grinding chamber, performing a cooling action on it during the grinding of the quantity coffee beans required for the preparation of the dose required for dispensing the beverage.

Thus, here in the known technique too, a possible accumulation of heat in the wall of the grinding chamber is not removed, considering that the cooling is performed only in combination with the grinding of the dose of coffee required to make the beverage.

BRIEF SUMMARY

An object of the present disclosure is to make a grinder provided with cooling capable of removing the heat generated and the heat possibly accumulated, without having to resort to the motor for driving the rotatable grinding wheel or controlling the dispensing of a dose of coffee, and therefore also in times when the grinder is not operating.

Thus, in one of the aspects the disclosure provides a grinder for beans of plant-based products, whose powder is adapted for use in the preparation of beverages, comprising:
a grinding chamber defined by a first cylindrical wall extending between a bottom and a top,
a pair of opposed grinding wheels, at least one whereof rotates, and which are located in said grinding chamber,
an electric motor for driving the rotating grinding wheel,
a hopper for loading the beans to be ground within the grinding chamber,
an outlet channel for unloading the ground product out of said chamber,
a first cooling duct extending around said first cylindrical wall between a first inlet and a first outlet,
a temperature sensor located in said first cooling duct,
a first tubular circuit extending between said first inlet and said first outlet, said first tubular circuit being in hydraulic communication with said first cooling duct and having a heat dissipating fluid flowing therethrough,
said first tubular circuit comprising
a motor pump for circulating the fluid in said first circuit and in said first cooling duct,
heat dissipating means,
at least one valve member,
an electronic control unit for actuating said motor pump and for turning on said heat dissipating means according to the value of temperature sensed by said temperature sensor,
said first cooling duct extending around said cylindrical wall being formed within the thickness of the wall and comprising
a series of pairs of axial recesses formed in the thickness of the cylindrical wall, connected together by circumferential passageways and separated by axial ribs,
said circumferential passageways being closed by plate-like members, with the interposition of seal elements.

BRIEF DESCRIPTION OF THE DRAWINGS

The disclosure is now described in greater detail with reference to certain preferred embodiments thereof, illustrated in the accompanying drawings, given by mere way of a non-limiting example, in which.

DETAILED DESCRIPTION

Figure 1:
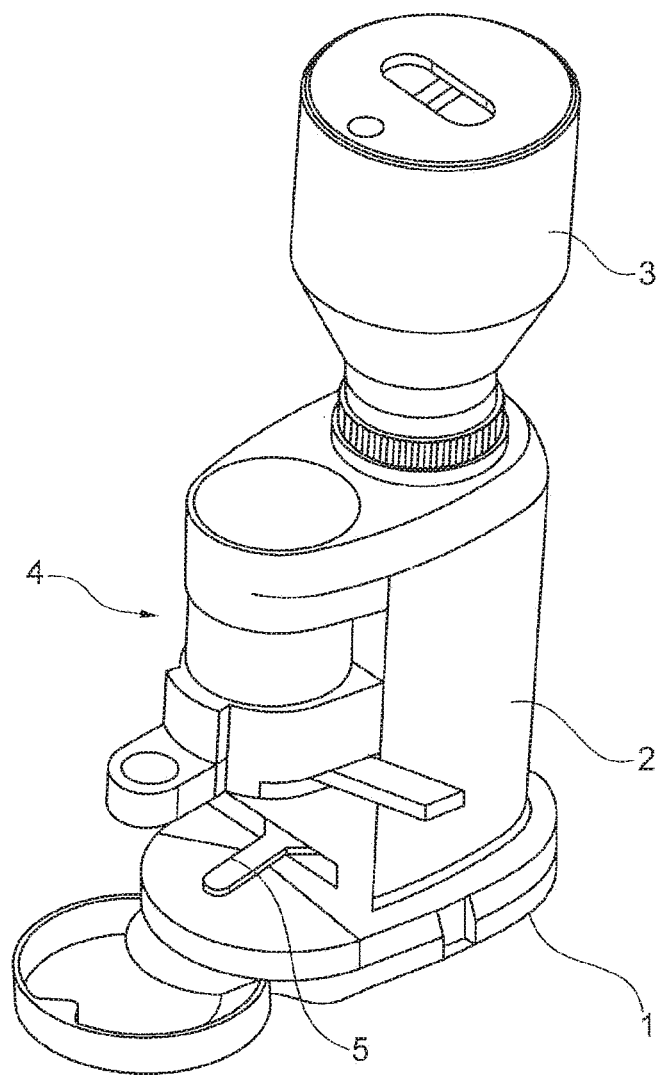
FIG. 1 is a schematic perspective view of a conventional grinder with doser for loading a dose of ground coffee into a filter holder for espresso coffee machines.

With reference to the aforesaid drawings and in particular to FIG. 1, it is worth noting that a conventional grinder—provided also with device for dispensing a specific dose of ground coffee in the filter holder of an espresso coffee machine—comprises a base 1 and a body 2, placed on the base.

Both the electric motor for actuating the rotating grinding wheel and the grinding chamber (not shown in said drawing) are accommodated in the body 2. Conventionally, above the body 2 is a hopper 3 in which there is contained the product to be ground—for example roasted coffee beans—to be supplied to the underlying grinding chamber.

In the front part of the body 2 itself is the device 4 for the preparation of the dose of ground coffee and for dispensing it into the filter holder (not shown in the drawing), which is rested on the specific support indicated diagrammatically with 5.

Figure 2:
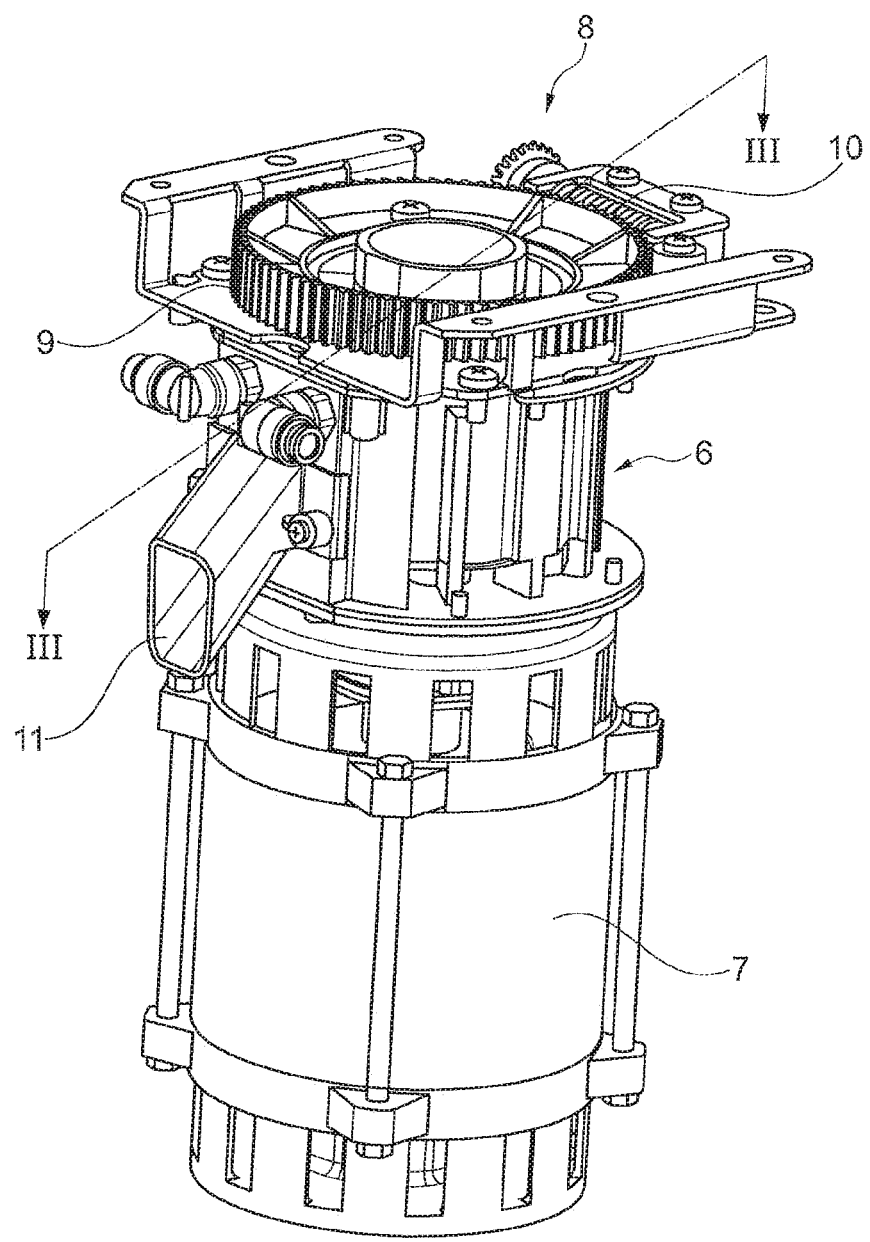
FIG. 2 is an external perspective view of the body of the grinder, comprising the grinding chamber according to the present disclosure and the mechanism for adjusting the distance between the grinding wheels.

With reference to FIG. 2, the grinding chamber (indicated with 6) is vertically positioned in axis with the housing 7 of the electric motor, and above it.

Above the grinding chamber 6, which is described in detail below, is a mechanism, in itself conventional, overall indicated with 8, for adjusting the distance between the grinding wheels and therefore for adjusting the grinding level desired for the ground product.

Such mechanism 8 comprises a gearwheel 9 and a worm gear 10, in tangential engagement with each other. The grinding chamber 6 is provided with a discharging channel 11 for dispensing the ground product towards the device 4 for the preparation of the dose, in a completely conventional manner.

Figure 3:
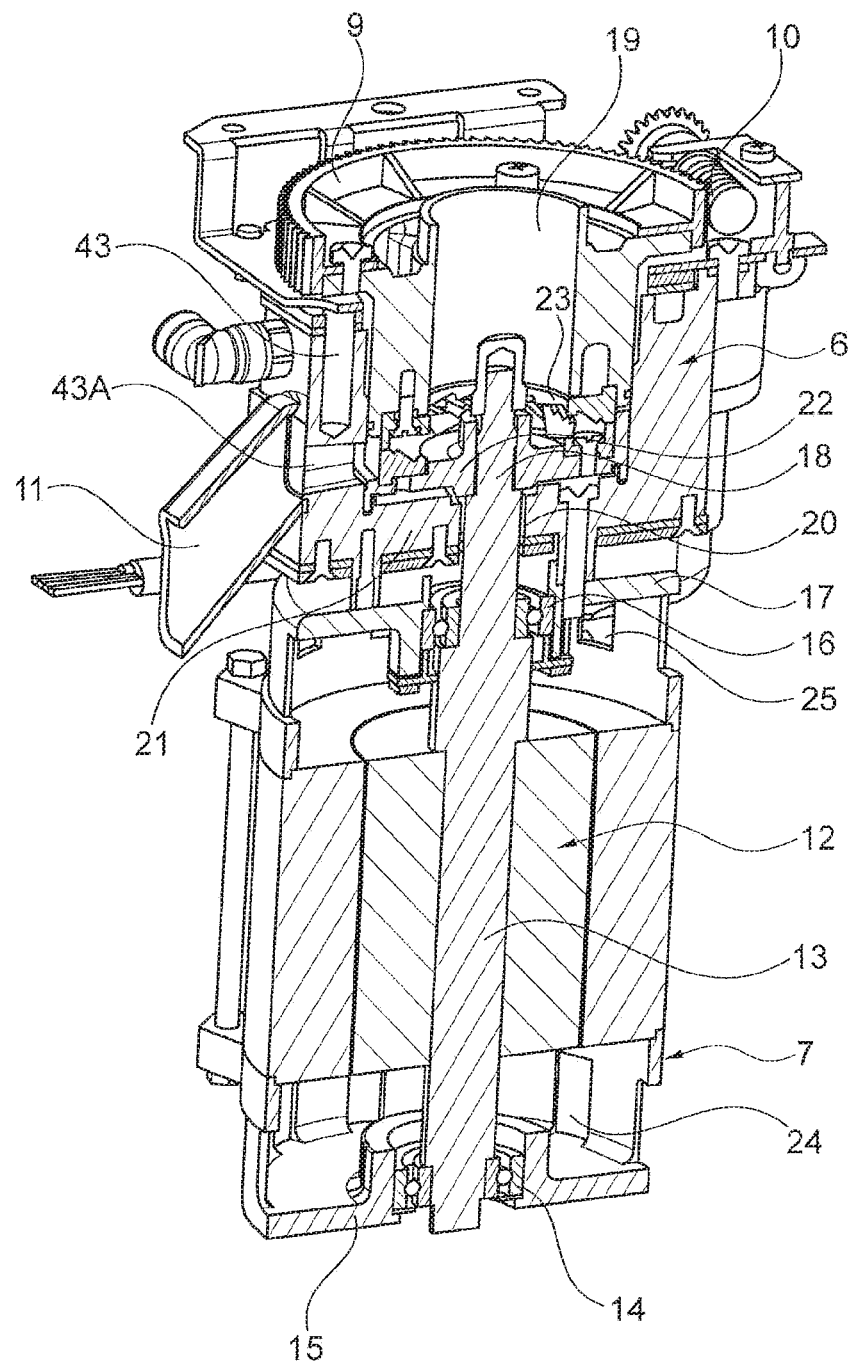
FIG. 3 is a perspective view of section of FIG. 2.

With reference to FIG. 3, the electric motor is indicated as a whole with 12, while its rotation shaft is indicated with 13.

The latter is mounted vertically between a bearing 14 placed in the lower wall 15 of the housing 7 and a bearing 16 placed in the upper wall 17 of the housing 7. The upper free end 18 of shaft 13 penetrates the cavity 19 of the grinding chamber 6 through a hole 20, provided on the bottom wall 21 of the grinding chamber itself, engaging with the rotating grinding wheel 22 of the pair of grinding wheels 22 and 23.

Figure 4:
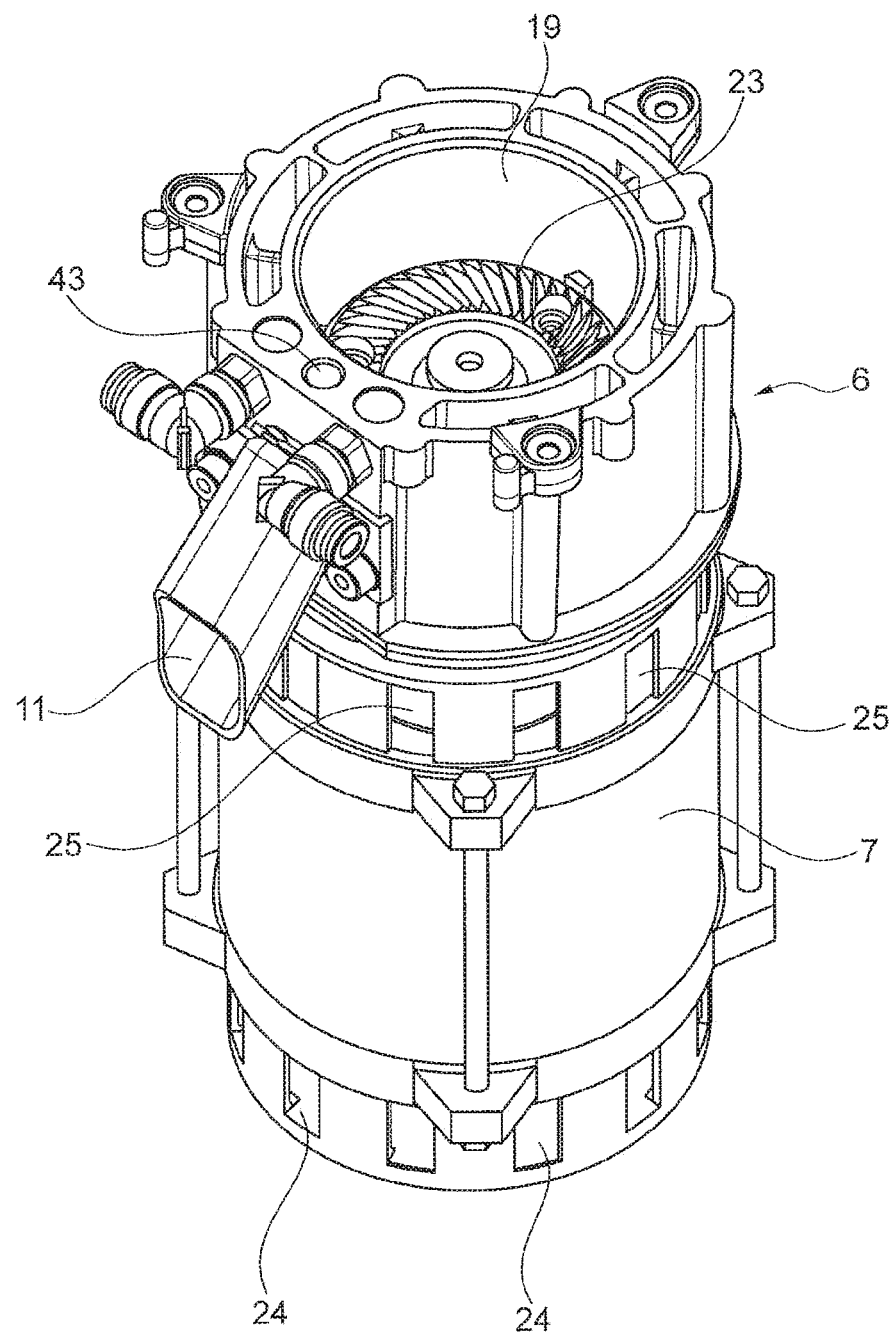
FIG. 4 is an external perspective view of the grinding chamber according to the disclosure, with relative electric motor for driving the rotatable grinding wheel.

With particular reference to FIG. 4, it is worth noting that the housing 7 of the electric motor 12 is provided with a first row of radial openings 24 placed close to the lower wall 15, and with a second row of radial openings 25 place close to the upper wall 17 for the passive disposal of the heat generated by the electric motor.

According to an alternative embodiment not shown in the drawings, the rows of radial openings 24 and 25 instead are not in the motor housing, with subsequent reduction of the efficiency of the passive disposal of the heat generated in such housing.

With reference to FIGS. 5, 6, 7 and 8, it is worth noting that the grinding chamber 6 is defined by a first cylindrical wall 26 which extends between a bottom 27 and a top 28. The cylindrical wall comprises a series of pairs of axial recesses 29 and 30 connected together by circumferential passageways 31 at the top 28 and by corresponding circumferential passageways 32 at the bottom 27. Axial separating ribs 33 are arranged between the pairs of axial recesses 29, 30.

The circumferential passageways 31 are closed by the application of an annular element 34 with the interposition of a seal 35 when the parts forming the body 2 of the grinder are mounted.

Similarly, the circumferential passageways 32 at the bottom 27 are closed by the application of a plate 36 and relative seal 37 when the parts forming the body 2 of the grinder are mounted.

The various pairs of axial recesses 29 and 30 are connected together in series with the formation of a first cooling duct, indicated as whole with C1, which is provided with a first inlet 39 and a first outlet 38, both positioned in a flat zone 40 of the cylindrical wall 26 where there are provided corresponding fittings 42 and 41 for the connection to external tubular circuits, as seen below.

A temperature sensor 44 is positioned in the same flat zone 40, in a hole 43 thereof, the function of which sensor is to result in the cooling operation, in addition to sensing the temperature of the grinding chamber 6, as is seen in the continuation of the description. The temperature sensor 44 indeed is connected with an electronic control unit, indicated with ECU in FIGS. 11, 12, 13 and 14.

As shown in FIG. 3, the hole 43 for housing the temperature sensor 44 and also the sensor itself advantageously extend deep up to coming close to the passageway 43A which places the inside 19 of the grinding chamber in communication with the discharging channel 11 of the ground product.

Figure 3A:
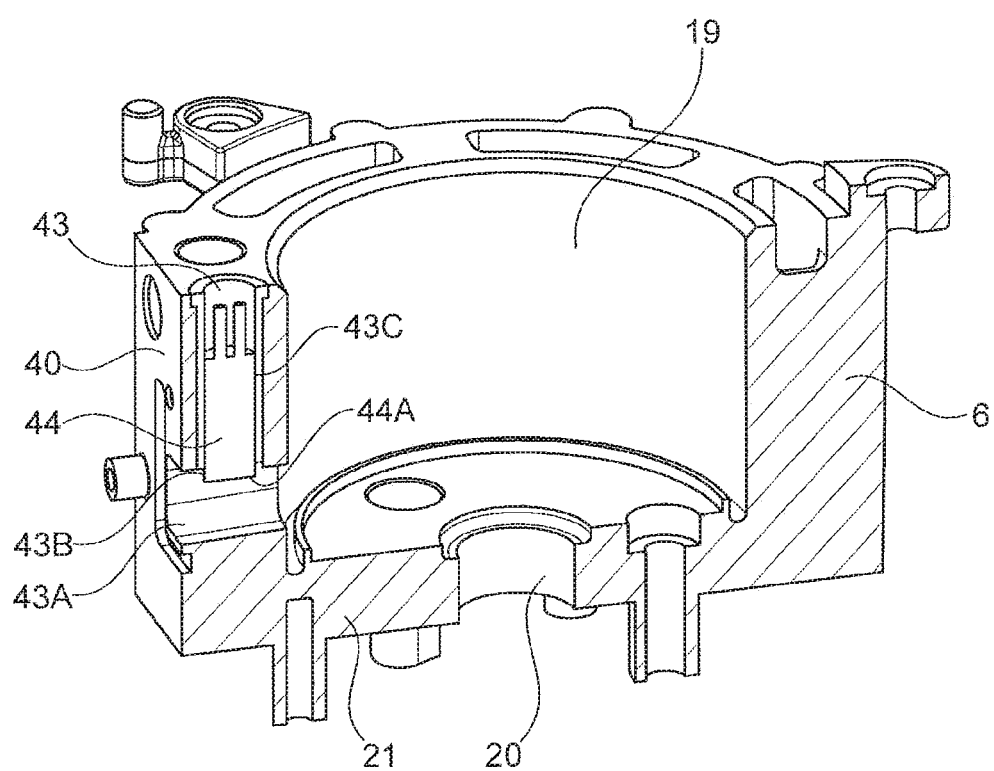
FIG. 3A is a perspective view of the cross section of the grinding chamber with the housing of the modified temperature sensor.

With particular reference to FIG. 3A, which shows a modified embodiment of the housing of the temperature sensor 44, the hole 43 extends deep up to leading—with the opening 43B—into the passageway 43A in which the ground coffee flows coming from the cavity 19 of the grinding chamber 6, in direction of channel 11.

The sensor 44, which is positioned inside the hole 43 with the interposition of an insulating bushing 43C, reaches inside the passageway 43A with the end 44A thereof.

With such arrangement, the temperature sensor 44 is capable of accurately sensing the temperature of the powder of ground product reaching the channel 11.

Preferably, the cylindrical wall 26 that defines the grinding chamber 6 is obtained by high pressure aluminium die casting, although other construction types may be considered for making the structure thereof.

Figure 5:
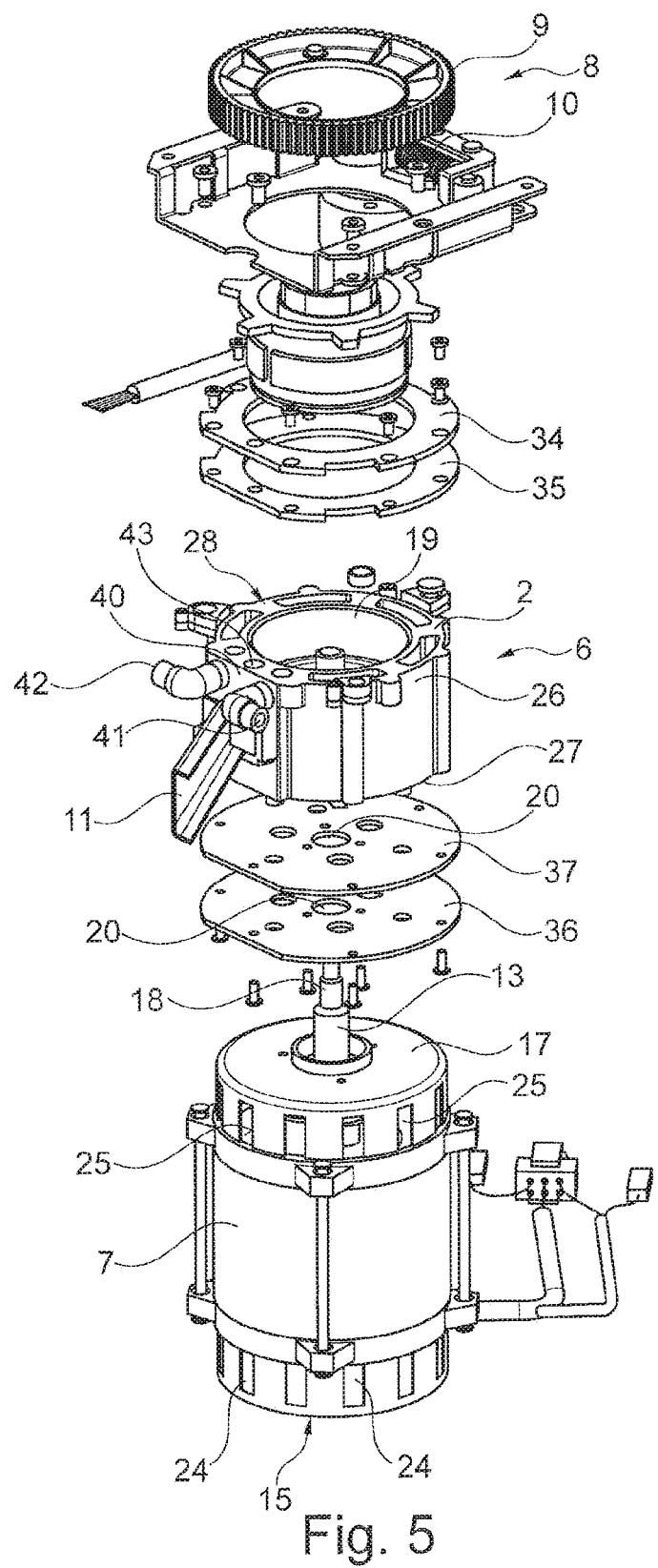
FIG. 5 is an exploded perspective view of the body of the grinder of FIG. 2.
Figure 6:
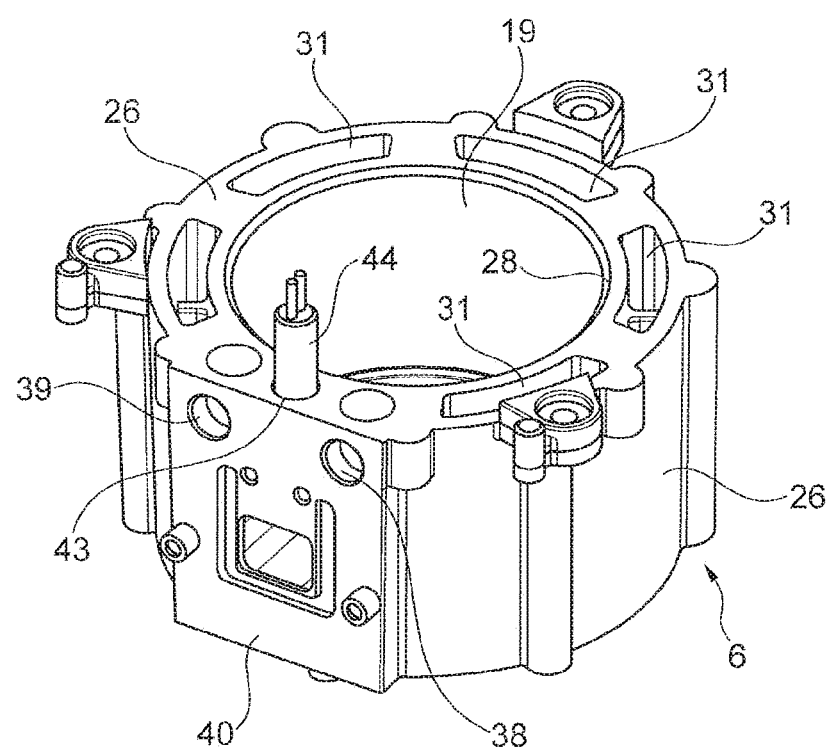
FIG. 6 is a perspective view of the grinding chamber according to the disclosure.
Figure 7:
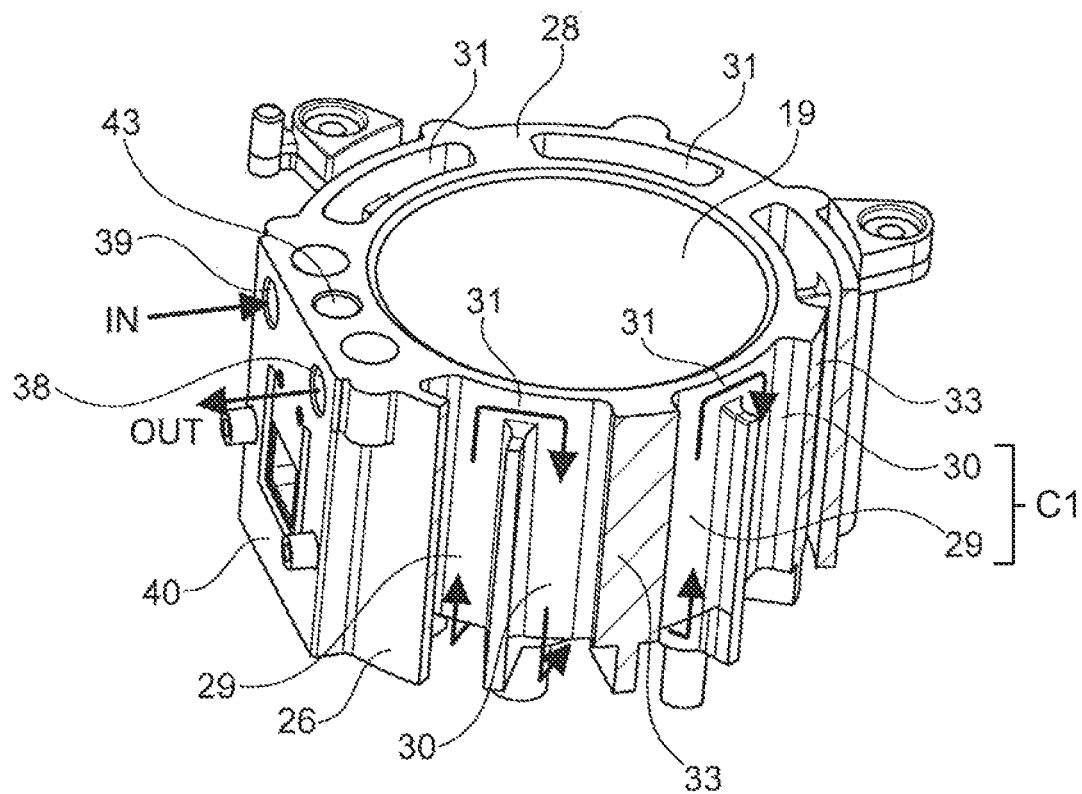
FIG. 7 is a partially sectioned perspective view of the grinding chamber according to the disclosure.
Figure 8:
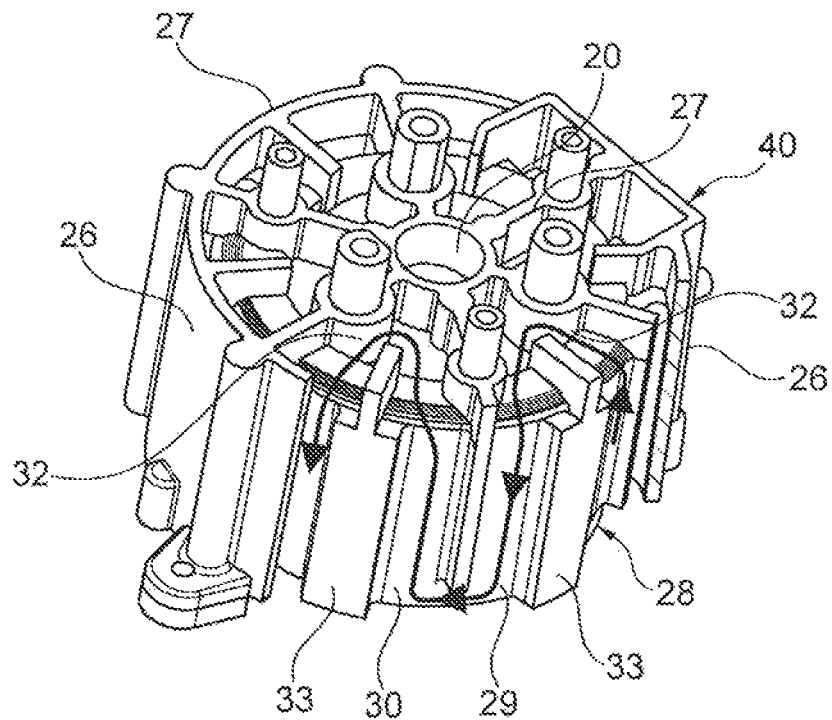
FIG. 8 is a partially sectioned perspective view of the grinding chamber, overturned with respect to the view of FIG. 7.

With particular reference to FIG. 5, it is worth noting that the mounting of the grinding chamber 6, the housing 7 of the electric motor, the pair of grinding wheels 22, 23 and the device 8 for adjusting the distance between the grinding wheels, with the formation of the body 2 of the grinder, is performed with the use of screw members (which do not need to be described because they are entirely conventional).

Figure 9:
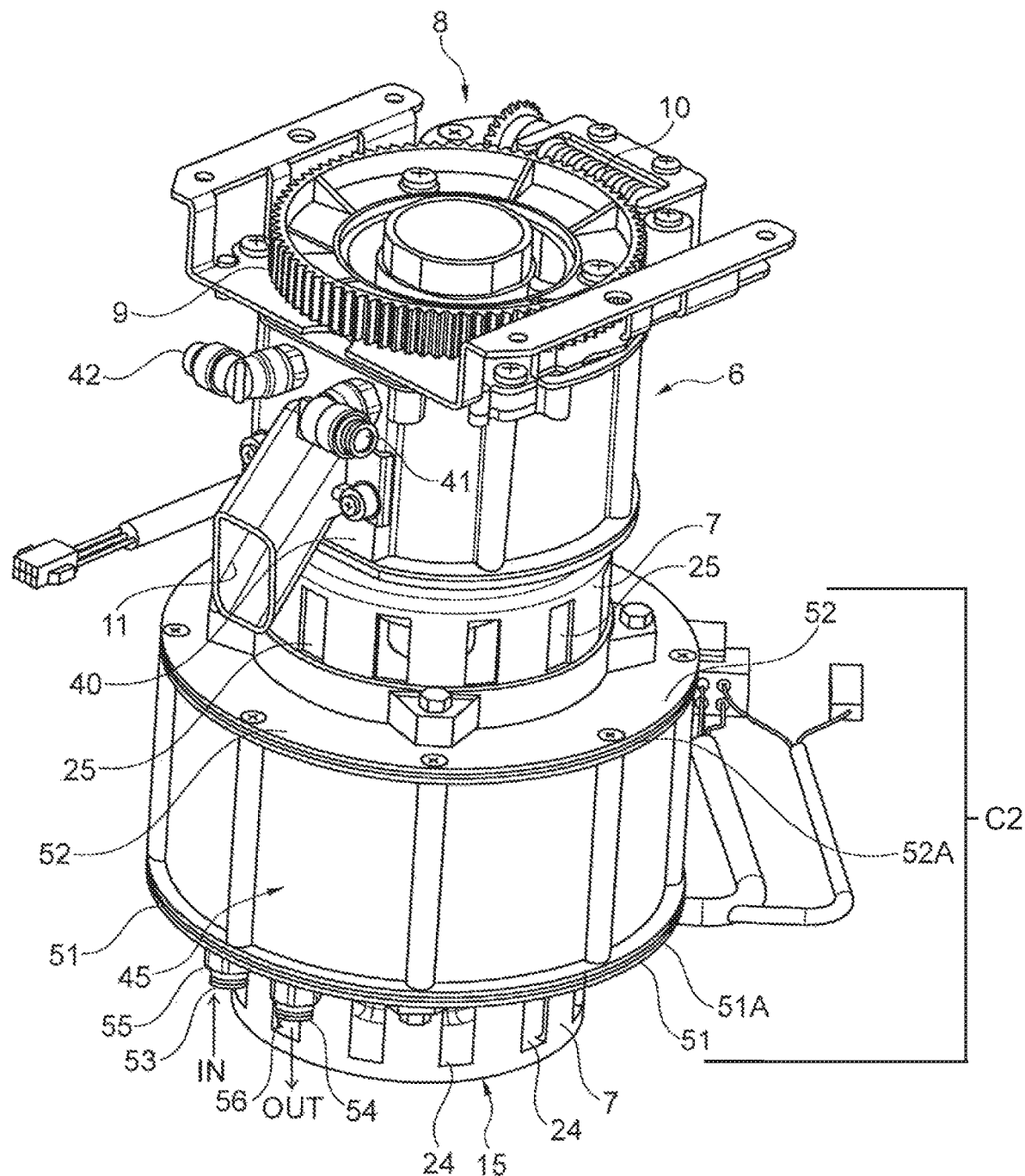
FIG. 9 is an external perspective view of the body of the grinder showing a modified embodiment with respect to the one of the preceding drawings.
Figure 10:
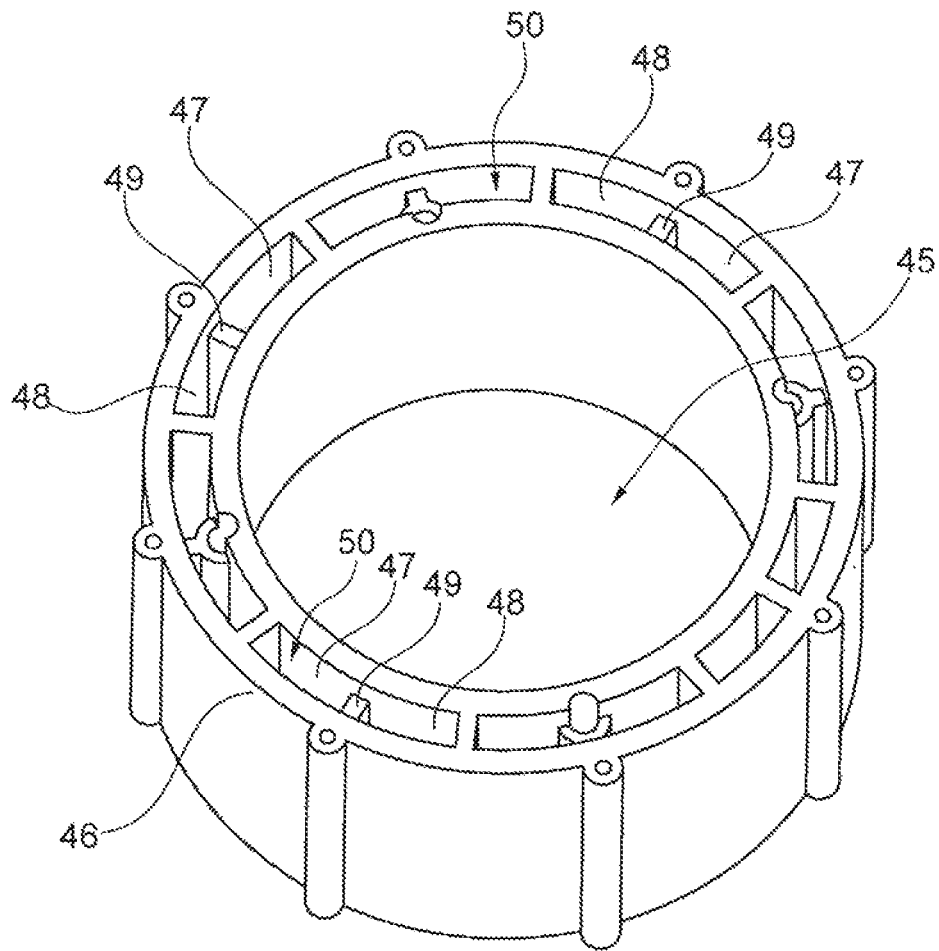
FIG. 10 is a perspective view of a chamber for containing the electric motor of the grinder of FIG. 9.

With reference to FIGS. 9 and 10, a second modified embodiment of the grinder is noted in which the parts corresponding to the ones of the embodiment described above are indicated with the same reference numerals.

It is worth noting in particular in such modified embodiment, that the housing 7 of the electric motor for driving the rotating grinding wheel 22 is contained inside a chamber 45 defined by a second cylindrical wall 46 in which thickness there are obtained axial recesses 47, 48 separated by axial ribs 49 and connected, at an end thereof, by circumferential passageways 50.

Observing FIG. 9, it is worth noting that the cylindrical wall 46 is equipped with an annular plate 51 at the bottom end, and with a similar annular plate 52 at the top end, by means of conventional screws axially engaging in the thickness of the cylindrical wall 46 itself.

With the interposition of respective seals 51A and 52A, the annular plates 51 and 52 close the circumferential passageways 50, thus contributing to the formation of a second cooling duct, indicated as a whole with C2, which extends around the chamber 45 for containing the housing 7 of the motor between a second inlet 53 and a second outlet 54, they also provided with respective fitting devices 55 and 56 for the connection to external tubular circuits, as seen below.

Figure 11:
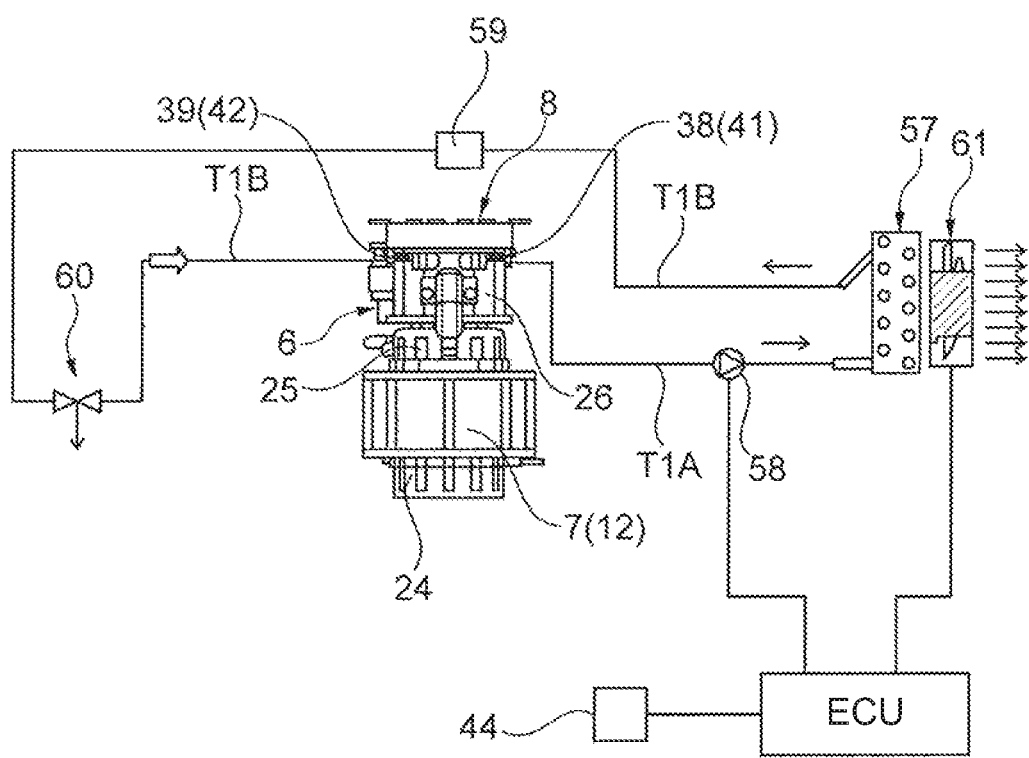
FIG. 11 shows the diagram of the first tubular circuit in the cooling embodiment of the grinding chamber alone.

With reference to FIG. 11, it is worth noting that in the first embodiment of the grinder in which only the cylindrical wall 26 that defines the grinding chamber 6 is provided with the first cooling duct C1, the grinder comprises a first tubular circuit indicated as a whole with T1.

The stretch T1A of such circuit connects the first outlet 38, provided with fitting 41, with a radiator 57, and is provided with a motor pump 58 for the circulation of the fluid, particularly cooling fluid, admitted into the same tubular circuit and also into the duct C1 connected thereto.

The outlet from the radiator 57 is connected to the branch T1B of the circuit T1 and through a reservoir 59 and a valve 60 for discharging or admitting the cooling fluid, it reaches the inlet 39, with fitting 42, of the first cooling duct C1.

The radiator 57 is associated in conventional manner with an electric fan 61 for the formation of an airflow flowing through the radiator 57.

The motor pump 58 and the electric fan 61 are connected to the electronic control unit ECU for the actuation thereof as a function of the temperature signal received from the sensor 44.

Figure 12:
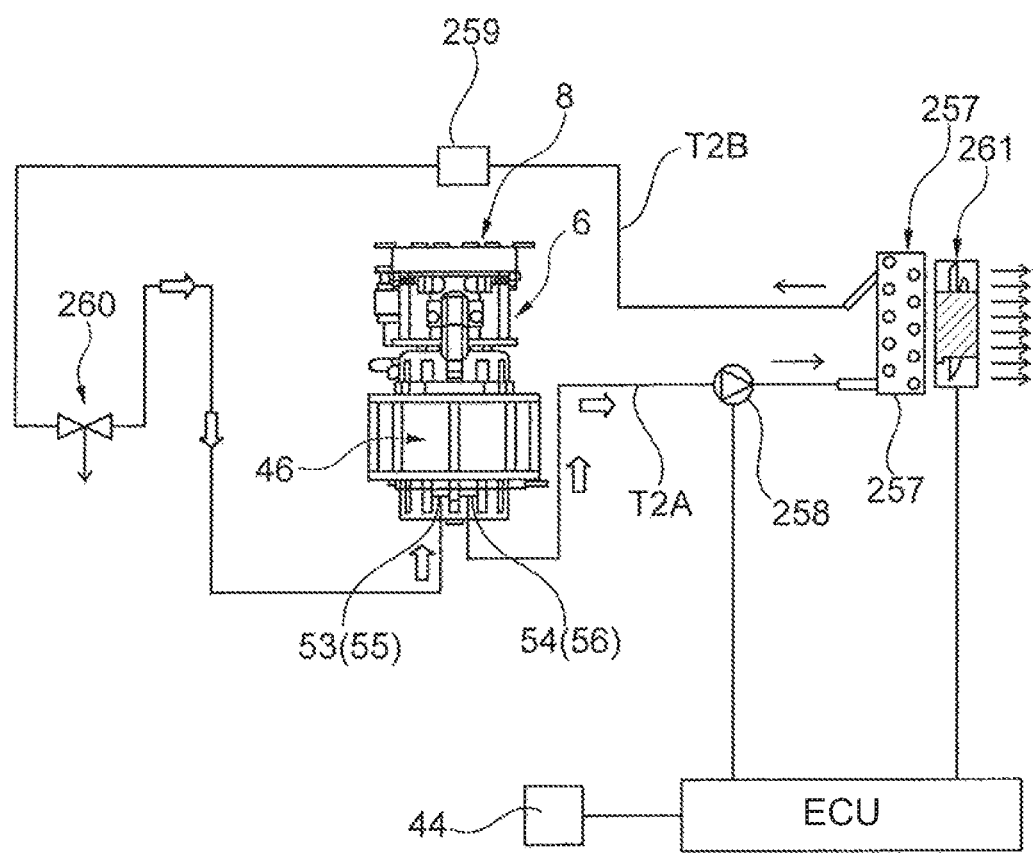
FIG. 12 shows the diagram of the second tubular circuit in the cooling embodiment of the electric motor alone.

With reference to FIG. 12, it is worth noting that in the second embodiment of the grinder in which also the housing 7 of the electric motor is contained inside a chamber 45 defined by a second tubular wall 46 and provided with a second cooling duct C2, the grinder comprises a second tubular duct indicated as a whole with T2.

The stretch T2A of such circuit connects the second outlet 54, provided with fitting 56, with a second radiator 257 and is provided with a motor pump 258 for the circulation of the fluid, particularly cooling fluid, admitted into the same tubular circuit T2 and also into the duct C2 connected thereto.

The outlet from the radiator 257 is connected to the branch T2B of the circuit T2 and through a reservoir 259 and a valve 260 for discharging or admitting the cooling fluid, it reaches the second inlet 53, with fitting 55, of the second cooling duct C2.

The second radiator 257 is associated in conventional manner with a second electric fan 261 for the formation of an airflow flowing through the radiator 257, thereby creating complete independence of the cooling of the electric motor housing from the cooling of the grinding chamber.

The motor pump 258 and the electric fan 261 are connected to the electronic control unit ECU for the actuation thereof as a function of the temperature signal received from the sensor 44.

Figure 13:
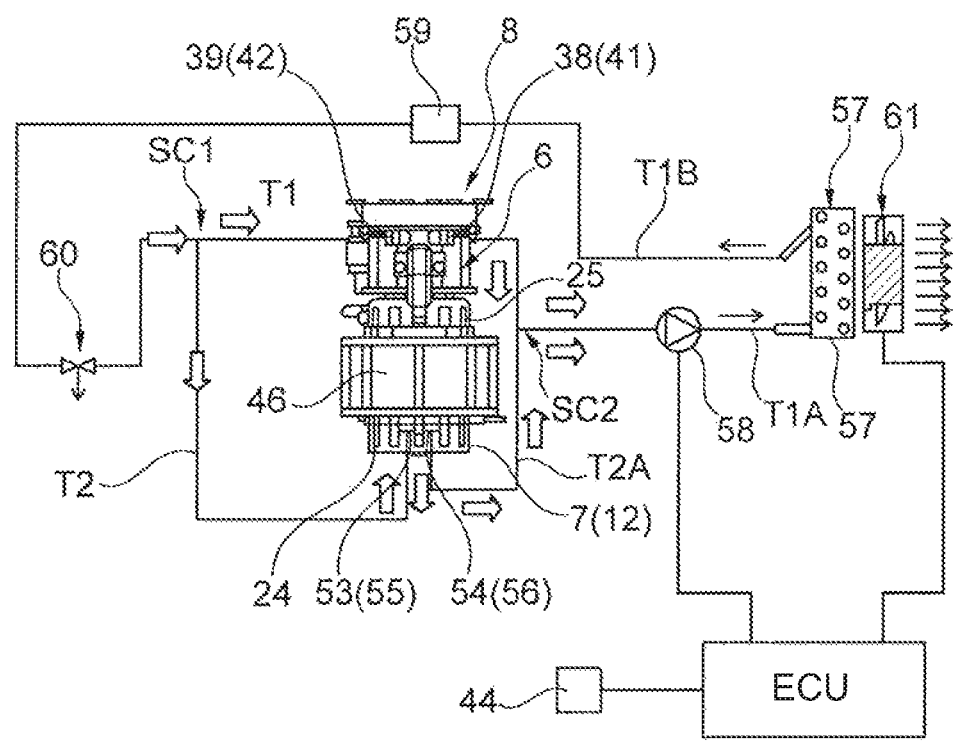
FIG. 13 shows the diagram of the first and second tubular circuit in the cooling embodiment both of the grinding chamber and of the electric motor, in the parallel connection version of the two circuits.

Alternatively, with reference to FIG. 13, in the second embodiment of the grinder, the tubular circuits T1 and T2, connected to the cooling ducts C1 and C2 respectively, may be joined together in parallel by means of providing a first connection joint SC1 entering the cooling circuits C1 and C2, and a second connection joint SC2 coming out of the cooling circuits C1 and C2 themselves.

The same components of the tubular circuit T1 may be used with such parallel connection, like alternatively also the ones forming the tubular circuit T2 may be used, thereby achieving a simultaneous cooling of the grinding chamber and of the motor housing.

Figure 14:
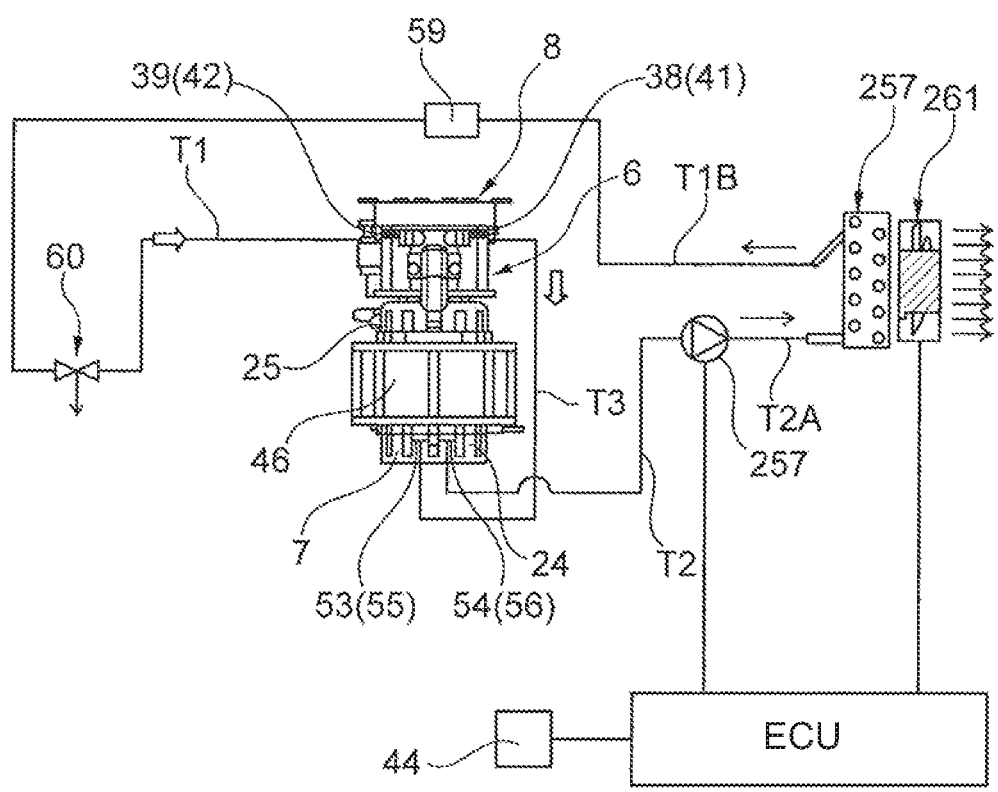
FIG. 14 shows the diagram of the first and second tubular circuit in the cooling embodiment both of the grinding chamber and of the electric motor, with the presence of the third tubular circuit for the version of connection in series of the circuits.

With reference to FIG. 14, according to a further alternative, in the second embodiment of the grinder, the tubular circuits T1 and T2, connected to the cooling ducts C1 and C2 respectively, may be joined together in series by means of providing a third tubular circuit T3 connecting the first outlet 38, with fitting 41 of the first cooling duct C1 of the first cylindrical wall 26, with the second inlet 53, with fitting 55, of the second cooling duct C2 of the second cylindrical wall 46.

The radiators 57 and 257, with the relative electric fans 61 and 261, form a system for dissipating the heat held by the cooling fluid contained in the circuits C1, T1, C2, T2.

Figure 15:
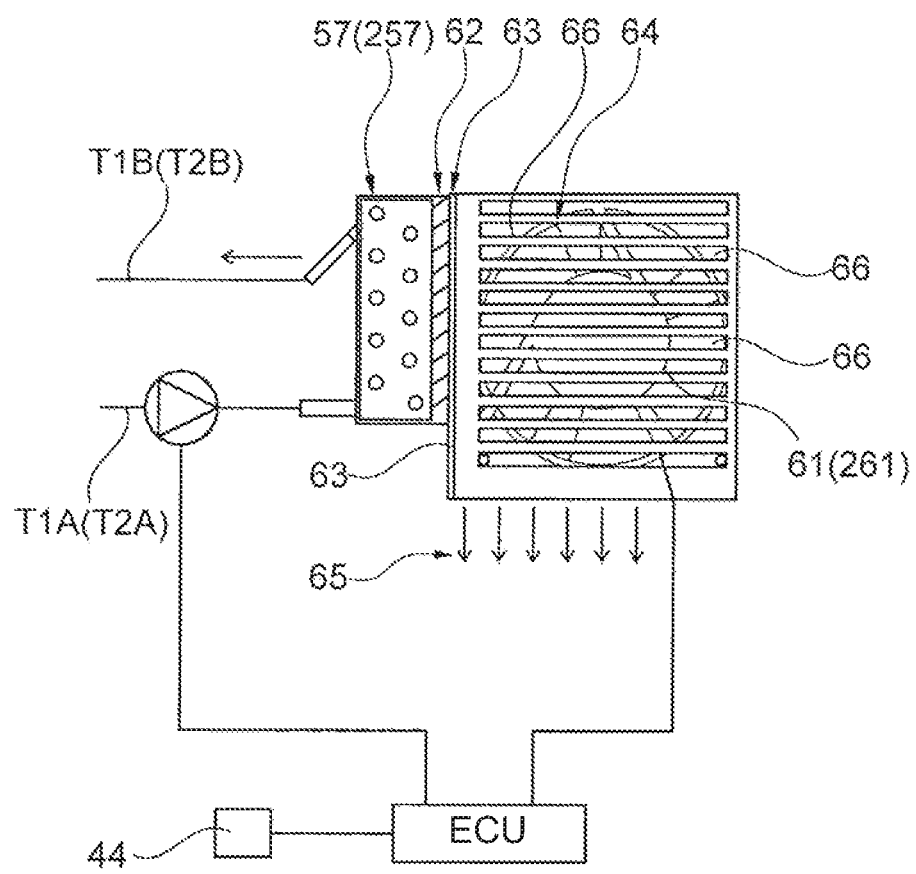
FIG. 15 shows a modified version of the dissipation system of the heat held by the cooling fluid passing through the circuits of FIGS. 11, 12, 13 and 14.

In an alternative embodiment shown in FIG. 15, such heat dissipation system is strengthened by means of placing one or more conventional Peltier cells (indicated diagrammatically with 62) positioned with the cold joining thereof against the radiators 57 or 257.

Such cells 62 are intended to be electrically supplied with relative conventional supply circuits (not shown in FIG. 15).

The hot joint of the Peltier cells 62 instead preferably is positioned in contact with the outer surface 63 of a box-like element 64, inside of which the electric fan 61 or 261 is placed, which produces a cooling airflow (diagrammatically depicted by arrows 65) passing through the slots 66 made in the outlining walls thereof.

From that described above and illustrated in the accompanying drawings, it is possible, with the grinder according to the disclosure, to perform the cooling of the grinding chamber in a completely independent manner from the grinding operation, both during grinding—by means of different motor means than the ones designated to driving the grinding wheel—and during periods in which the grinder is not operating.

Indeed, the activation of the cooling of the grinding chamber is actuated by putting into operation the motor pump 58 which puts the cooling liquid into movement in the tubular circuit T1 and in the duct C1, and possibly also the electric fan 61 associated with the radiator 57 when the electronic control unit ECU receives a signal from the sensor 44 indicating the temperature has exceeded a predetermined threshold value (for example 30° C.) in the grinding chamber 6.

The cooling may be limited to the grinding chamber 6 but it may also extend to the chamber 45 provided for containing the housing 7 of the electric motor, like it may also be actuated only for the aforesaid chamber 45 according to the exceeded level of the threshold value of the temperature reached in the grinding chamber 6.

Finally, the cooling may be achieved by means of the type of parallel circulation (FIG. 13) of the fluid in the grinding chamber and in the motor housing chamber, or with the type of circulation in series of the same fluid passing first in the grinding chamber and then in the motor housing chamber (FIG. 14).

Therefore, according to the disclosure, not only is the heating of the product powder avoided—particularly ground coffee—thus reducing the negative consequences of organoleptic type, but it is also avoided for the heat expansions of the supports of the grinding wheels in the grinding chamber to interfere with adjusting the distance between the grinding wheels themselves, thus avoiding particle size errors in the ground product.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A grinder for beans of plant-based products, whose powder is adapted for use in preparing beverages, comprising:
    a grinding chamber defined by a first cylindrical wall;
    a pair of opposed grinding wheels, wherein at least one of the pair of opposed grinding wheels is a rotating grinding wheel, the pair of opposed grinding wheels located in said grinding chamber;
    an electric motor configured to drive the rotating grinding wheel;
    a hopper configured to load the beans to be ground within the grinding chamber;
    an outlet channel configured to unload a ground product out of said chamber;
    a first cooling duct extending around said first cylindrical wall between a first inlet and a first outlet, wherein the first cooling duct is formed within a thickness of the cylindrical wall and includes a first series of pairs of axial recesses formed in the thickness of the first cylindrical wall, connected together by first circumferential passageways and separated by first axial ribs, said first circumferential passageways being closed by first annular plates;
    a temperature sensor located in said first cooling duct; and
    a first tubular circuit extending between said first inlet and said first outlet, said first tubular circuit being in hydraulic communication with said first cooling duct and having a first heat dissipating fluid flowing therethrough, said first tubular circuit comprising a first motor pump for circulating the first heat dissipating fluid in said first tubular circuit and in said first cooling duct, a first heat dissipater, and a first valve member including a fluid on/off valve for admitting and discharging said first heat dissipating fluid, and wherein said first motor pump and said first heat dissipater are configured to be activated according to a value of temperature sensed by said temperature sensor.

2. The grinder of claim 1, wherein said first heat dissipater includes a radiator, within said first tubular circuit, and an airstream generator.

3. The grinder of claim 1, wherein said first tubular circuit includes a reservoir for containing said first heat dissipating fluid.

4. The grinder of claim 1, further comprising:
a motor chamber, vertically aligned with said grinding chamber and defined by a second cylindrical wall, wherein said electric motor is accommodated;
a second cooling duct extending around the second cylindrical wall between a second inlet and a second outlet;
a second tubular circuit extending between said second inlet and said second outlet, said second tubular circuit being in hydraulic communication with said second cooling duct and having a second heat dissipating fluid flowing therethrough, said second tubular circuit further comprising a second motor pump for circulating the second heat dissipating fluid in said second tubular circuit and in said second cooling duct, a second heat dissipater, and a second valve member, said second motor pump and said second heat dissipater configured to be activated according to the value of temperature sensed by said temperature sensor, wherein said second cooling duct is formed within a thickness of said second cylindrical wall and comprises a second series of pairs of axial recesses formed in the thickness of the second cylindrical wall, connected together by second circumferential passageways and separated by second axial ribs, said second circumferential passageways being closed by second annular plates.

5. A grinder for beans of plant-based products, whose powder is adapted for use in preparing beverages, comprising:
a grinding chamber defined by a first cylindrical wall;
a pair of opposed grinding wheels located in said grinding chamber, wherein at least one of the pair of opposed grinding wheels is a rotating grinding wheel;
an electric motor configured to drive the rotating grinding wheel;
a hopper configured to load the beans to be ground within the grinding chamber;
an outlet channel configured to unload a ground product out of said chamber;
a first cooling duct extending around said first cylindrical wall between a first inlet and a first outlet, wherein the first cooling duct is formed within a thickness of the first cylindrical wall and includes a first series of pairs of axial recesses formed in the thickness of the first cylindrical wall, connected together by first circumferential passageways and separated by first axial ribs, said first circumferential passageways being closed by first annular plates;
a temperature sensor located in said first cooling duct;
a first tubular circuit extending between said first inlet and said first outlet, said first tubular circuit being in hydraulic communication with said first cooling duct and having a first heat dissipating fluid flowing therethrough, said first tubular circuit comprising a first motor pump for circulating the first heat dissipating fluid in said first tubular circuit and in said first cooling duct, a first heat dissipater, and a first valve member;
a motor chamber, vertically aligned with said grinding chamber and defined by a second cylindrical wall, wherein said electric motor is accommodated in the motor chamber;
a second cooling duct extending around the second cylindrical wall between a second inlet and a second outlet; and
a second tubular circuit extending between said second inlet and said second outlet, said second tubular circuit being in hydraulic communication with said second cooling duct and having the first heat dissipating fluid flowing therethrough, said first motor pump being configured to circulate the first heat dissipating fluid in said second tubular circuit and in said second cooling duct, wherein said second cooling duct is formed within a thickness of said second cylindrical wall and comprises a second series of pairs of axial recesses formed in the thickness of the second cylindrical wall, connected together by second circumferential passageways and separated by second axial ribs, said second circumferential passageways being closed by second annular plates,
wherein said first motor pump and said first heat dissipater are configured to be activated according to a value of temperature sensed by said temperature sensor.

6. The grinder of claim 4, further comprising:
a third tubular circuit connecting said first outlet of said first cooling duct of the first cylindrical wall with said second inlet of said second cooling duct of said second cylindrical wall, said first inlet of the first cooling duct and said second outlet of said second cooling duct being connected with said first tubular circuit and with said second tubular circuit respectively.

7. The grinder of claim 1, further comprising a doser for dosing the ground product that comes out of the grinding chamber.

8. The grinder of claim 1, wherein the beans are roasted coffee beans.

9. The grinder of claim 1, wherein said first heat dissipater includes a radiator, an electric fan, and at least one Peltier cell located between the radiator and the electric fan.

10. The grinder of claim 5, wherein said first tubular circuit includes a reservoir for containing said first heat dissipating fluid.

11. The grinder of claim 5, further comprising:
a doser configured to dose the ground product that comes out of the grinding chamber.

12. The grinder of claim 5, wherein the beans are roasted coffee beans.

13. The grinder of claim 5, wherein said first heat dissipater includes a radiator, an electric fan, and at least one Peltier cell located between the radiator and the electric fan.

* * * * *